United States Patent
Uppiano

[11] 3,986,464
[45] Oct. 19, 1976

[54] ROW CROP PLANTING MACHINE

[75] Inventor: Richard F. Uppiano, Hagerman, Idaho

[73] Assignee: Acme Manufacturing Company, Inc., Filer, Idaho

[22] Filed: Mar. 10, 1975

[21] Appl. No.: 557,021

[52] U.S. Cl. .................................. 111/59; 172/311
[51] Int. Cl.² .................................... A01B 15/14
[58] Field of Search ........................ 172/310–311, 172/314, 693, 694, 448–449, 459, 470, 657; 111/59, 60, 62, 85

[56] References Cited
UNITED STATES PATENTS

| | | | |
|---|---|---|---|
| 1,938,132 | 12/1933 | Broemmelsick et al. | 172/310 X |
| 2,640,405 | 6/1953 | Wheeler | 111/60 X |
| 2,641,886 | 6/1953 | Graham | 172/311 |
| 2,828,680 | 4/1958 | Johnson | 172/310 |
| 3,256,942 | 6/1966 | Van Sickle et al. | 172/310 |
| 3,705,560 | 12/1972 | Lappin | 111/85 |
| 3,774,693 | 11/1973 | Orthman | 172/311 |
| 3,880,241 | 4/1975 | Vincent | 172/311 |

*Primary Examiner*—Robert E. Bagwill
*Attorney, Agent, or Firm*—Mallinckrodt & Mallinckrodt

[57] ABSTRACT

A machine for planting agricultural crops, particular seed potatoes, has multiple chassis frames that each constitute a multi-row module so as to facilitate manufacture of various models, later conversions of one model to another, and assembly, shipping, and maintenance of the machine. The chassis frames are hinged to accommodate multiple planting devices to the varying contour of the farmland being planted. A central chassis frame is flanked at opposite sides by chassis frames supported by ground-engaging wheels, some of which serve to drive the mechanisms of the planting devices carried by the frames. Hinging of the frames at the front is accomplished by respective pairs of elongate and upstanding hinge plates arranged face-to-face and pivotally interconnected at their lower ends (located as close to ground level as practical considering operating requirements). The flanking frames are linked to the upper ends of corresponding plates of respectively adjacent sets of hinge plates by stabilizer bars having lost motion connections with such plates to limit the oscillation thereof and to both accommodate and limit the extent of rise and fall of such flanking frames. The lower ends of these stabilizer bars are pivotally attached to the respective frames so as to be length adjustable. Hinging at the rear is similar, but without stabilizer bars. This arrangement not only minimizes displacement of deposited seed materials from the centers of row furrows by reason of the effect on the machine of uneven terrain, but makes planting depth more even than is normally achieved with conventional planting machines.

17 Claims, 13 Drawing Figures

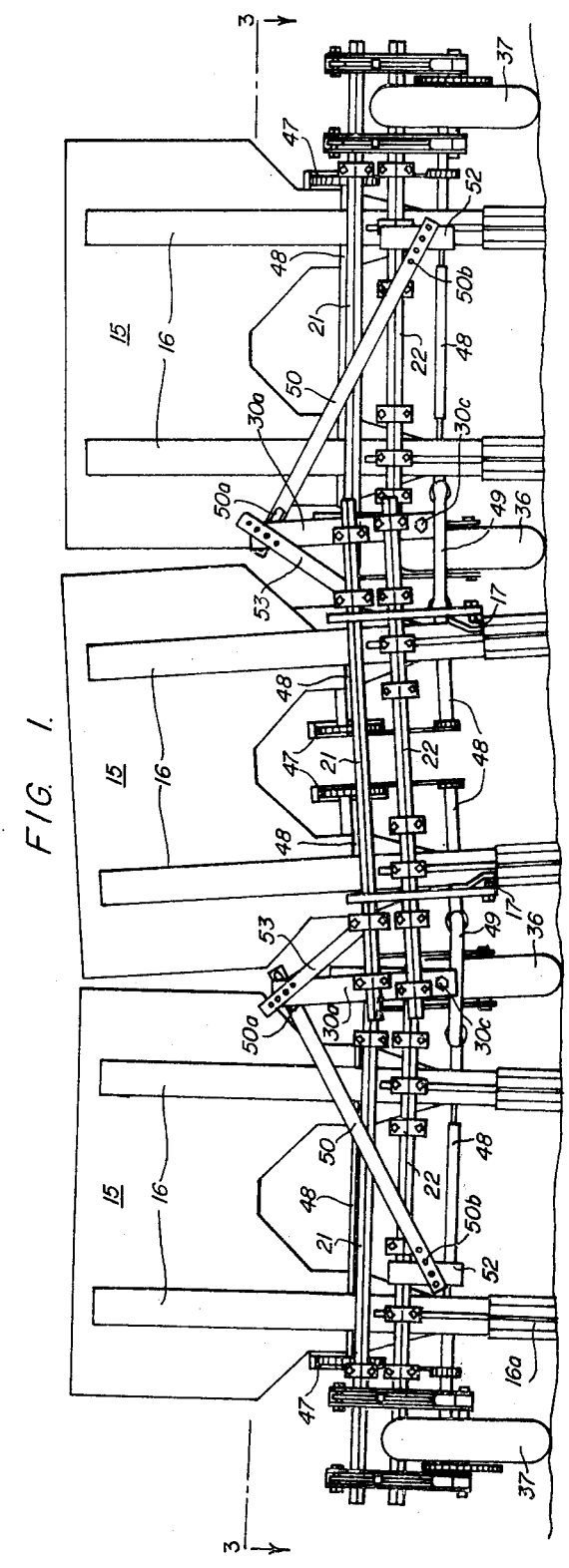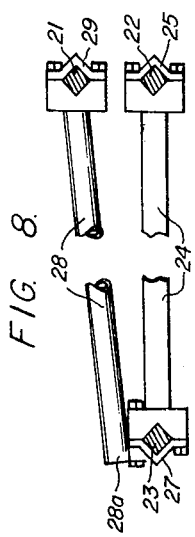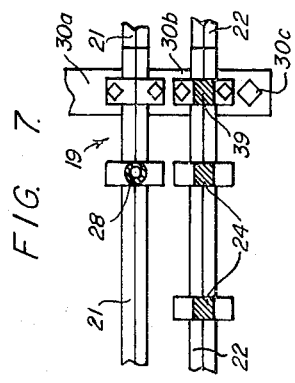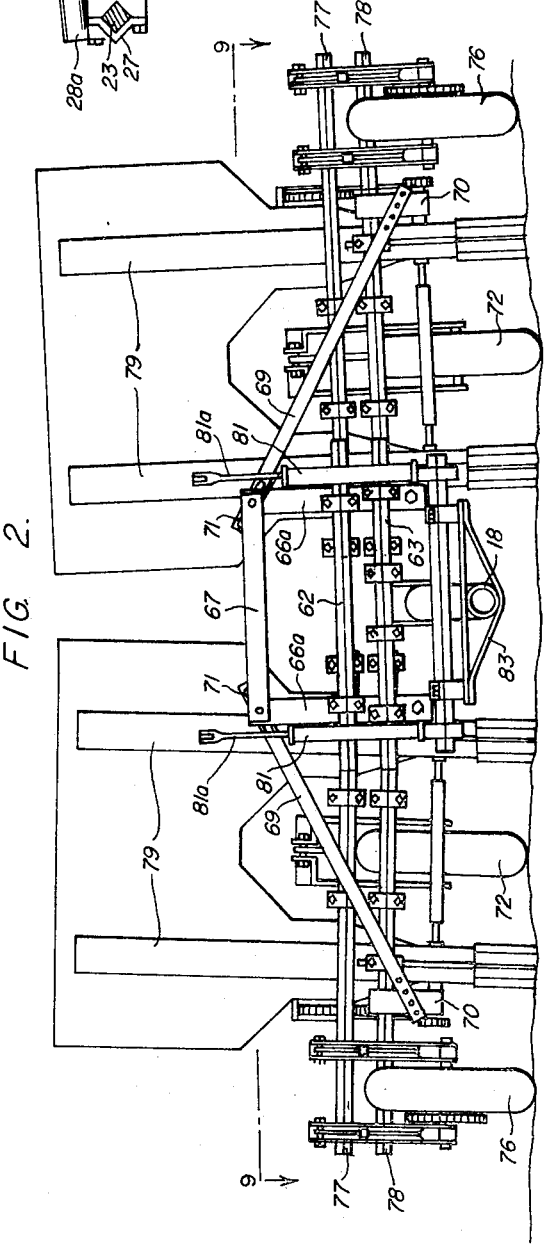

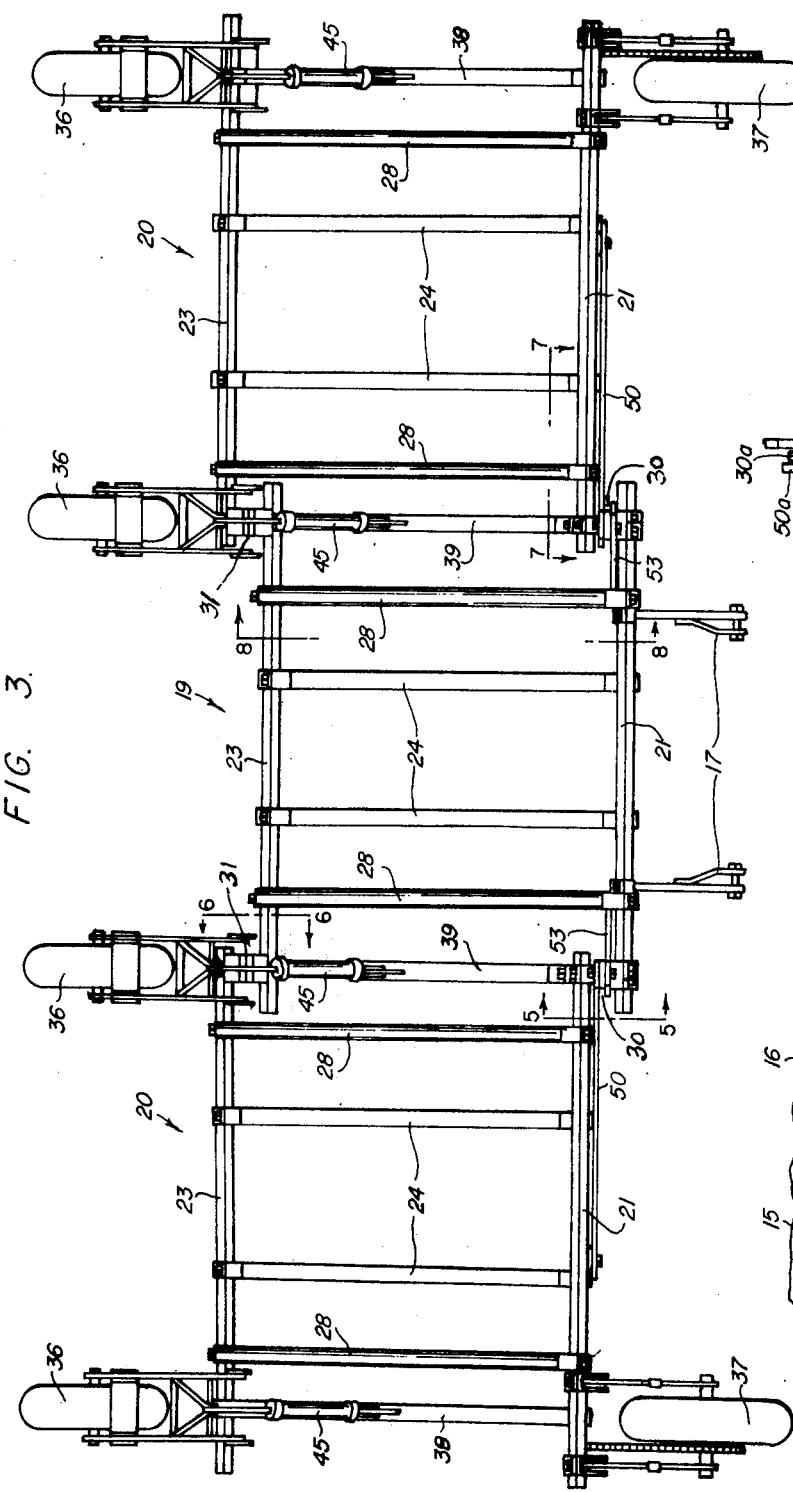
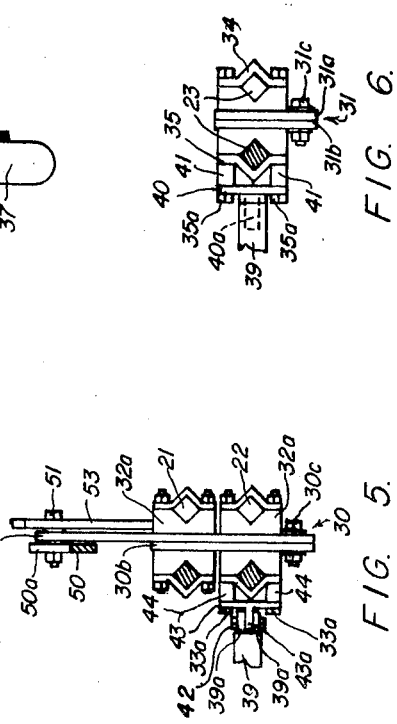
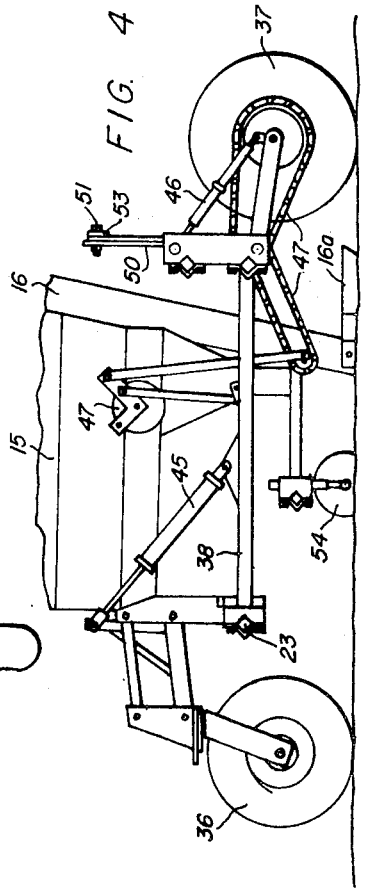

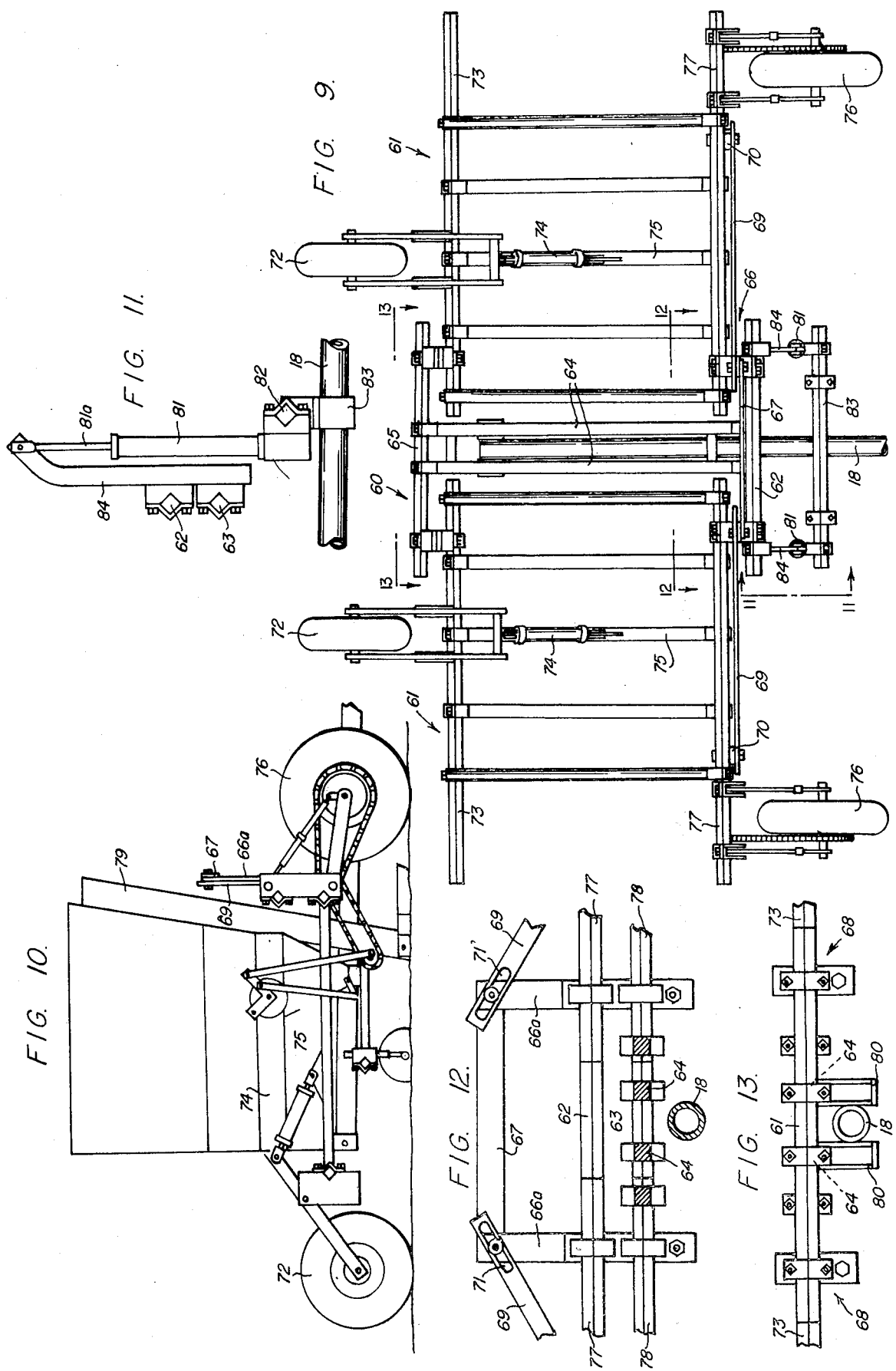

ROW CROP PLANTING MACHINE

BACKGROUND OF THE INVENTION

1. Field

The invention is in the field of row planters for agricultural crops, particularly those constructed to comprehend multiple rows and to flex laterally in accordance with ground terrain.

2. State of the Art

Various row crop planters of the type concerned have been developed heretofore, for example those shown by U.S. Pat. Nos. 2,640,405 and 3,741,312. But considerable room has been left for improved construction and operation.

SUMMARY OF THE INVENTION

It is the purpose of the invention to facilitate manufacture of different models of a planting machine, conversion of one model to a different model, assembly, shipment, and maintenance of the machine, and to provide for improved planting operation by minimizing displacement of seed materials from the centers of row furrows and by slowing the reaction of the seed-planting shoes to changes in elevation of the terrain.

To these ends, a planting machine provided with seed hoppers and planting devices of ordinary type has a center chassis frame (which may or may not carry a hopper and planting devices, depending upon the number of crop rows to be serviced) and flanking chassis frames at opposite lateral sides of the center frame.

The flanking frames are provided with ground wheels, some of which serve to drive seed-conveying mechanisms of the planting device. The center frame is provided with either a tongue for attachment to a tractive vehicle or with connections for a tractor hitch.

Special hinging and linking of the several chassis frames to one another permit the ground wheels to rise and fall in conformity with variations in terrain while maintaining the planting devices in desirable planting positions.

THE DRAWINGS

Embodiments representing the best mode presently contemplated of carrying out the invention are shown in the accompanying drawings, in which:

FIG. 1 is a view in front elevation of a six crop-row, potato planting machine in accordance with the invention wherein seed hoppers and planting devices are carried by the center frame;

FIG. 2, a similar view of a four crop-row, potato planting machine in accordance with the invention wherein the center frame does not carry seed hoppers nor planting devices;

FIG. 3, a top plan view of the machine of FIG. 1, the seed hoppers and planting devices having been removed for convenience of illustration;

FIG. 4, a view in side elevation taken from the left-hand side of FIG. 1;

FIG. 5, a fragmentary, longitudinal, vertical section taken on the line 5—5 of FIG. 3;

FIG. 6, a similar view taken on the line 6—6 of FIG. 3;

FIG. 7, a fragmentary, transverse, vertical section taken on the line 7—7 of FIG. 3;

FIG. 8, a longitudinal vertical section taken on the line 8—8 of FIG. 3, leaving out parts in the background and breaking out an intermediate portion of the length;

FIG. 9, a view similar to that of FIG. 3, but with respect to the machine of FIG. 2;

FIG. 10, a view similar to that of FIG. 4, but taken with respect to the machine of FIG. 9;

FIG. 11, a view similar to that of FIG. 5, but taken on the line 11—11 of FIG. 9;

FIG. 12, a fragmentary, transverse, vertical section taken on the line 12—12 of FIG. 9 and drawn to a larger scale; and FIG. 13, a fragmentary rear elevation taken from the standpoint of the line 13—13 of FIG. 9 and drawn to the larger scale of FIG. 12.

DETAILED DESCRIPTION OF THE ILLUSTRATED EMBODIMENTS

The embodiment illustrated in FIGS. 1 and 3 through 8 is a six-row, potato planting machine, while that illustrated in FIGS. 2 and 9 through 13 is a four-row, potato planting machine. Both are equipped with twin hoppers 15 for seed potatoes and with potato planting devices 16 of well-known type that in themselves form no part of the present invention. Both may be constructed for towing behind a farm vehicle by means of the usual tractor hitch 17, as in FIGS. 1 and 3, or by means of a tongue 18, as in FIGS. 2, 9, and 11. Both are made up of a plurality of two-row, module units as explained hereinafter.

The six-row machine comprises a central chassis frame 19, FIG. 3, and flanking chassis frames 20, respectively, at opposite lateral sides of central chassis frame 19 and hinged thereto.

The central frame 19 is made up, as shown in FIGS. 1, 3, and 8, of upper and lower, front, transverse frame members 21 and 22, respectively, a lower, rear, transverse frame member 23, lower longitudinal frame members 24 that are fastened rigidly at their front ends to transverse frame member 22 by clamps 25 and at their rear ends to transverse frame member 23 by clamps 26 and 27, and upper longitudinal frame members 28, FIG. 8, that are fastened rigidly at their forward ends to front transverse frame member 21 by clamps 29 and to rear transverse frame member 23 by respective dependent extensions 28a held by the clamps 27.

Each of the flanking frames 20 are similar in basic construction to the central frame 19 and to the flanking frames of the four-row machine of FIGS. 2 and 9 through 13. Each carries a twin hopper 15 and two of the row planting devices 16 and constitutes a module unit useful in the construction of various models of the planter machine. In all of these chassis frames, the positions of the upper longitudinal frame members 28 may be changed, if desired, to be on the other side of the planting devices 16. It should be particularly noted that the spacings across each frame of the side-by-side sets of lower and upper longitudinal frame members 24 and 28 and adjacent lower longitudinal frame members 24 are adjustable in accordance with crop row spacing of different fields to be planted.

Hinged connections of the flanking chassis frames 20 to the central chassis frame 19 are made by respective sets of hinge devices 30, FIGS. 1 and 3, at the front of the machine, and 31, FIG. 3, at the rear.

Each of the front hinge devices 30 comprises a relatively long and upstanding plate 30a, see particularly FIG. 5, at the front and a relatively short and upstanding plate 30b behind it, the two plates being joined face-to-face by a bolt 30c near the bottom serving as a pivot pin. The upper and lower transverse frame members 21 and 22 of center frame 19 are rigidly fastened at opposite ends thereof to front plates 30a by respective clamps 32, parts 32a of which are welded to the respective plates 30a. The upper and lower transverse frame members 21 and 22 of each flanking chassis frame 20 are similarly fastened to a hinge plate 30b by respective clamps 33. The pivotally joined hinge plates of each set are free to oscillate about the pivot connection 30c of the set as an axis and along a plane of oscillation that extends transversely of the direction of travel of the machine.

The rear hinge devices 31, FIG. 6, are similar, but the plates 31a and 31b thereof are of equal length and relatively short as compared with the hinge plates 30a and 30b. They are joined face-to-face by a bolt 31c serving as a pivot pin are free to oscillate about such pivot connection as an axis. Rear transverse frame member 23 of central frame 19 has its opposite ends rigidly fastened to respective hinge plates 31a by respective clamps 34, and the rear transverse frame member 23 of each flanking chassis frame 20 has an end similarly fastened to a hinge plate 31b by a clamp 35.

Each of the flanking chassis frames are provided with ground-engaging wheels which support the machine during planting operations and enable it to be hauled from place to place. In the six-row, tractor hitch machine of FIGS. 1 and 3, two swivel-mounted wheels 36 are carried at opposite lateral sides and at the rear of each flanking frame 20 by rear transverse frame member 23 and by hinge 31, see particularly FIG. 6, and a single, non-swivel-mounted wheel 37 is carried at the outside and at the front of each such flanking frame by both the lower and the upper, front, transverse, frame members 21 and 22. An outside, longitudinal, frame member 38 rigidly interconnects the lower, front, transverse frame member 22 and the rear, transverse, frame member 23 in line with the outside, rear wheel 36 and the front wheel 37, and a longitudinal frame member 39 of center chassis frame 19, which is in line with the inside, rear wheel 36, articulatively connects hinge plate 31a of rear hinge 31 with hinge plate 30b of front hinge 30.

Articulation of the center chassis frame member 39 relative to the hinge plates with which it is connected to achieved, at the rear, on a horizontal, longitudinal axis by a pivot pin 40a, FIG. 6, received by and operating in a bearing recess in the connecting rearward end of frame member 39. Such pivot pin projects forwardly from an attachment plate 40 secured to hinge plate 31a by clamp bolts 35a extending through tubular spacers 41. Articulation is achieved at the front on a vertical axis by a pivot pin 42, FIG. 5, received by forwardly projecting ears 39a of frame member 39 and by a thereby sandwiched, rearwardly projecting ear 43a of an attachment plate 43. Such attachment plate is secured to hinge plate 30b by clamp bolts 33a extending through tubular spacers 44.

Hydraulic power cylinders 45 provide for lifting rear wheels 36 during road travel place to place and also enable downward pressure to be exerted on such wheels when desired, control being exerted from the cab of the tractor through the usual hydraulic system (not shown). Planting depth adjustment is provided by means of turnbuckles 46, FIG. 4.

The forward wheels 37 serve to drive planting mechanism (not shown) within the planting devices 16, as by means of sprocket and linkage drive mechanism 47 of conventional type and drive shafts 48, FIG. 1, and universal joints 49 transmitting driving power across the flanking frames 20 to the center frame 19.

Oscillation of the several chassis frames relative to one another is limited by means of stabilizer bars 50 having lost motion connections 50a with hinge plates 30a of respective front hinges 30, as can best be seen in FIGS. 1 and 5. The lost motion connections with the hinge plates are made by bolts 51 passing through slotted ends of such stabilizer bars. The opposite ends of the stabilizer bars are rigidly but adjustably fastened by bolting to anchor plates 52, which are rigidly secured to respective, lower, front, transverse, frame members 22 as by welding. A series of bolt holes 53 along the length of the bar ends provide for length adjustment to accommodate for different crop row spacings. Hinge plates 30a are secured against oscillation by means of bars 53, anchored to center frame 19 at their lower ends and adjustably anchored at their upper ends to the hinge plates 30a by bolting similarly to the bolting of the lower ends of stabilizer bars 50.

As is conventional, harrow discs 54, FIG. 4, are mounted behind the shoes 16a of planting devices 16 to cover seed potatoes deposited in the crop rows. Also, the usual trash shoes 55, FIG. 1, are mounted forwardly of planting shoes 16a.

Superior planting results are obtained by reason of the low hinge points 30c and 31c, the stabilized hinging, the wheel arrangement on the flanking frames, and the articulated longitudinal frame members of the flanking frames in this relatively wide and heavy six-row machine. Manufacturing and handling are facilitated, as previously indicated, by the modular frame construction and by the easily joined and separated hinging arrangement. Row spacing adjustments can be made independently of the hinging and without separating the several chassis frames.

The four-row machine illustrated by FIGS. 2 and 9 through 13, as presently constructed, does not require the articulated longitudinal frame members of the flanking frames and has a somewhat different stabilizing arrangement. Moreover, its center frame is narrower than the previously described modular chassis frames, and there are only two rear wheels, which are positioned differently in the flanking frames. Otherwise, the two embodiments of the invention are essentially the same, except that, as illustrated, the four-row machine is tongue-attached to the tractive vehicle. As previously indicated, however, either machine may be constructed with a tractor hitch or with a tongue. If the former, the rear wheels will be of swivel type; if the latter, the rear wheels will be of non-swivel type.

As illustrated, the four-row machine is provided with a center chassis frame 60 and with flanking chassis frames 61 of the same modular construction as the flanking chassis frames 20.

Center frame 60 comprises upper and lower, front, transverse, frame members 62 and 63, respectively, and lower, rear, transverse, frame members 62 and 63, respectively, and a lower, rear, transverse, frame member 64, the lower members being rigidly joined by lower longitudinal, frame members 65. Upper, transverse, frame member 62 is rigidly joined with the other frame members of such center frame 60 by the forward hinge plates 66a of front hinges 66, which plates are themselves rigidly joined together at their upper ends by a cross-plate 67. Hinging at the rear is by means of hinges 68 similar to the hinges 31.

Stabilization is effected by stabilizer bars 69, respectively, adjustably secured at their lower ends to respective anchor plates 70 and fastened at their upper ends to respective hinge plates 66a by lost motion connections 71.

A pair of non-swiveling rear wheels 72 are carried by rear, transverse, frame members 73 intermediate the widths of flanking chassis frames 61 and are provided, respectively, with hydraulic power cylinders 74 reactive against longitudinal frame members 75. A similar pair of front wheels 76 are carried by upper and lower, front, transverse frame members 77 and 78 of the flanking frames 61 at the outer ends thereof.

Drive of the potato planting mechanisms of planting devices 79 is accomplished from front wheels 76 in a manner similar to the six-row machine.

Tonge 18 is suspended at the rear from longitudinal frame members 64 by hanger brackets 80, FIGS. 9 and 13, and at the front from transverse frame members 62 and 63 by hydraulic power cylinders 81, FIGS. 2, 9, and 11, which are arranged to lift and lower the chassis frames and the structure carried thereby hydraulically. Such cylinders 81 are secured to a cross-piece 82, which is connected to tongue 18 by a yoke 83. The piston rods 81a of the power cylinders are pivotally connected to respective columns 84, which are secured to the front, transverse, frame members 62 and 63. With this arrangement, a relatively lightweight tractor can be employed to pull the machine, and lifting of the front of the machine to clear trash and for transport is accomplished by the power cylinders 81.

Whereas the invention is here illustrated and described with respect to preferred specific embodiments thereof, it should be understood that various changes may be made without departing from the inventive concepts pointed out in the claims that follow.

I claim:

1. A row crop planting machine, comprising a center chassis frame and flanking chassis frames hinged to the center frame at opposite lateral sides thereof so as to rise and fall according to ground contour; ground-engaging wheels secured to the flanking frames; seed hoppers and planting devices carried by at least the flanking frames; each of said frames comprising transverse frame members at front and rear and longitudinal frame members secured to said transverse frame members, certain of said longitudinal frame members of at least the flanking frames being associated with the hoppers and planting devices carried by those frames; front and rear hinge means between each flanking frame and the center frame; and a longitudinal frame member of each flanking frame being aligned with the front and rear hinge axes of the corresponding flanking frame and articulatively connected at its front end with a transverse frame member of the said corresponding flanking frame and articulatively connected at its rear end with a transverse frame member of the center frame, the articulative connection at the front end having a substantially vertical pivot axis, and the articulative connection at the rear end having a substantially horizontal pivot axis.

2. A row crop planting machine, comprising a center chassis frame and flanking chassis frames hinged to the center frame at opposite lateral sides thereof so as to rise and fall according to ground contour; ground-engaging wheels secured to the flanking frames; seed hoppers and planting devices carried by at least the flanking frames; each of said frames comprising transverse frame members at front and rear and longitudinal frame members secured to said transverse frame members, certain of said longitudinal frame members of at least the flanking frames being associated with the hoppers and planting devices carried by those frames; front and rear hinge means between each flanking frame and the center frame, each front hinge means comprising a hinge member carried and held rigidly by the center frame; and stabilizer members for said front hinge means, each of said stabilizer members being connected at one of its ends to a flanking frame and at its other end to the said hinge member of the adjacent front hinge means, the said connections being pivotal and including provision for lost motion.

3. A machine according to claim 2, wherein the ground-engaging wheels include a pair of rear wheels at opposite ends, respectively, of each flanking frame and a single front wheel at the outer end of each flanking frame; and the articulatively connected longitudinal member of each flanking frame is aligned with the rear wheel at the inner end of said frame.

4. A machine according to claim 3, wherein the rear wheels are interconnected with respective hydraulic power cylinders for raising and lowering such wheels.

5. A machine according to claim 4, wherein a tractor hitch is provided at the front of the center frame and the rear wheels are of swivel type.

6. A machine according to claim 2, wherein the specified hinge member of each front hinge means is elongate and upstanding, has its lower end positioned below the chassis frames, and has a hinge pivot in its lower end; and wherein each front hinge means has a second hinge member that is relatively short, is secured to a flanking frame, and is pivotally connected to the first hinge member in face-to-face relationship therewith by said hinge pivot thereof.

7. A machine according to claim 6, wherein each of the rear hinge means is similar to a front hinge means but the hinge members are of substantially equal length and shorter than the hinge members of the front hinge means.

8. A machine according to claim 6, wherein the elongate, first hinge member of each front hinge means is held rigidly by the center frame by reason of connection therewith by means of a stabilizer bar, each of said stabilizer bars being length adjustable, and each of the stabilizer members being length adjustable at its pivotal securement to a flanking frame.

9. A machine according to claim 1, wherein an elongate tongue is provided intermediate the width of the center frame and projecting forwardly therefrom for connection to a tractive vehicle; and a hydraulic lift is provided astride the tongue and forwardly of the frames for raising and lowering the forward ends of the frames relative to the tongue.

10. A machine according to claim 2, wherein each of said stabilizer members is an elongate bar pivotally secured at one of its ends to a flanking frame and attached at its other end to the hinge member of the adjacent front hinge means by a lost motion connection.

11. A machine according to claim 2, wherein one of the connections of each stabilizer member is adjustable as to length of said stabilizer member.

12. A row crop planting machine, comprising a center chassis frame and flanking chassis frames hinged to the center frame at opposite lateral sides thereof so as to rise and fall according to ground contour; ground-engaging wheels secured to the flanking frames; seed hoppers and planting devices carried by at least the flanking frames; each of said frames comprising transverse frame members at front and rear and longitudinal frame members secured to said transverse frame members, certain of said longitudinal frame members of at least the flanking frames being associated with the hoppers and planting devices carried by those frames; front and rear hinge means between each flanking frame and the center frame; each of the flanking frames having an upper and lower, front, transverse frame member and only a lower, rear, transverse frame member; and said certain of the longitudinal frame members comprising respective sets of an upper and a lower longitudinal frame member at one lateral side of an associated seed hopper and planting device and only a lower longitudinal frame member at the other lateral side of said associated seed hopper and planting device, the said upper longitudinal frame member of the set sloping downwardly from attachment to the upper transverse frame member at the front of the frame to attachment to the lower transverse frame member at the rear of the frame.

13. A machine according to claim 12, wherein the center frame is constructed similarly to the flanking frames.

14. A row crop planting machine, comprising a center chassis frame and flanking chassis frames hinged to the center frame at opposite lateral sides thereof so as to rise and fall according to ground contour; ground-engaging wheels secured to the flanking frames; seed hoppers and planting devices carried by at least the flanking frames; each of said frames comprising transverse frame members at front and rear and longitudinal frame members secured to said transverse frame members, certain of said longitudinal frame members of at least the flanking frames being associated with the hoppers and planting devices carried by those frames; front and rear hinge means between each flanking frame and the center frame, the center frame being narrower than the flanking frames and not carrying seed hoppers and planting devices; each front hinge means comprising an elongate and upstanding hinge member carried and held rigidly by the center frame, having its lower end positioned below the chassis frames, and being provided with a hinge pivot in its lower end, and further comprising a second hinge member that is relatively short, is secured to a flanking frame, and is pivotally connected to the first hinge member in face-to-face relationship therewith by said hinge pivot thereof; and a cross-piece interconnecting the upper ends of the first hinge members of the front hinge means.

15. A machine according to claim 14, wherein there are provided stabilizer bars having lower ends pivotally and adjustably, as to length, connected to the respective flanking frames, and having upper ends attached to upper ends of the first hinge members of the respective front hinge means by lost motion connections.

16. A machine according to claim 15, wherein the ground-engaging wheels comprise a pair of rear wheels carried by the respective flanking frames intermediate their widths and a pair of front wheels carried by the respective flanking frames at the outer sides thereof.

17. A row crop planting machine, comprising a center chassis frame and flanking chassis frames hinged to the center frame at opposite lateral sides thereof so as to rise and fall according to ground contour; ground-engaging wheels secured to the flanking frames; seed hoppers and planting devices carried by at least the flanking frames; each of said frames comprising transverse frame members at front and rear and longitudinal frame members secured to said transverse frame members, certain of said longitudinal frame members of at least the flanking frames being associated with the hoppers and planting devices carried by those frames; front and rear hinge means between each flanking frame and the center frame, said hinge means each comprising flat plate hinge members attached, respectively, to the center frame and a flanking frame and disposed face-to-face and depending below the frames to provide respective planes of oscillation extending transversely of the direction of travel of the machine, and means pivotally interconnecting said face-to-face members below the frames so oscillation of the frames relative to one another will be along said planes of oscillation on hinge axes disposed below the frames; and limit stop stabilizer means between each flanking frame and the center frame for limiting up and down relative movement of the frames to predetermined maximum deviations in ground contour.

* * * * *